R. R. GRIFFITH.
SPLIT PULLEY.
APPLICATION FILED DEC. 22, 1916.
1,268,242.
Patented June 4, 1918.
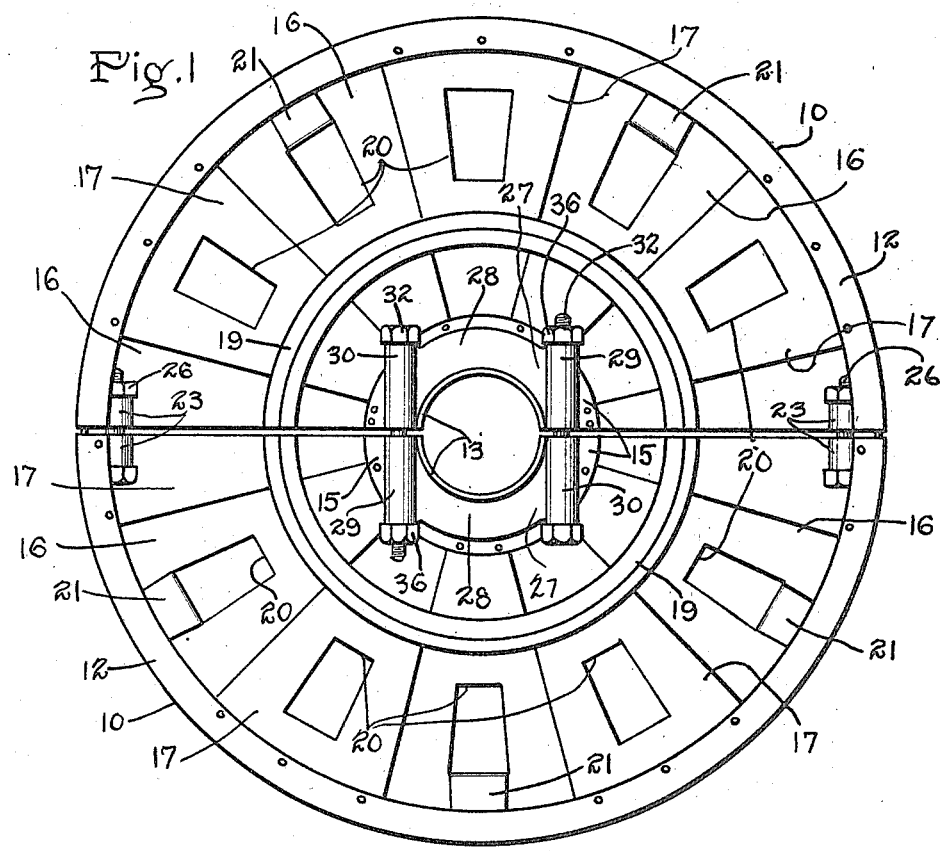
Fig. 1
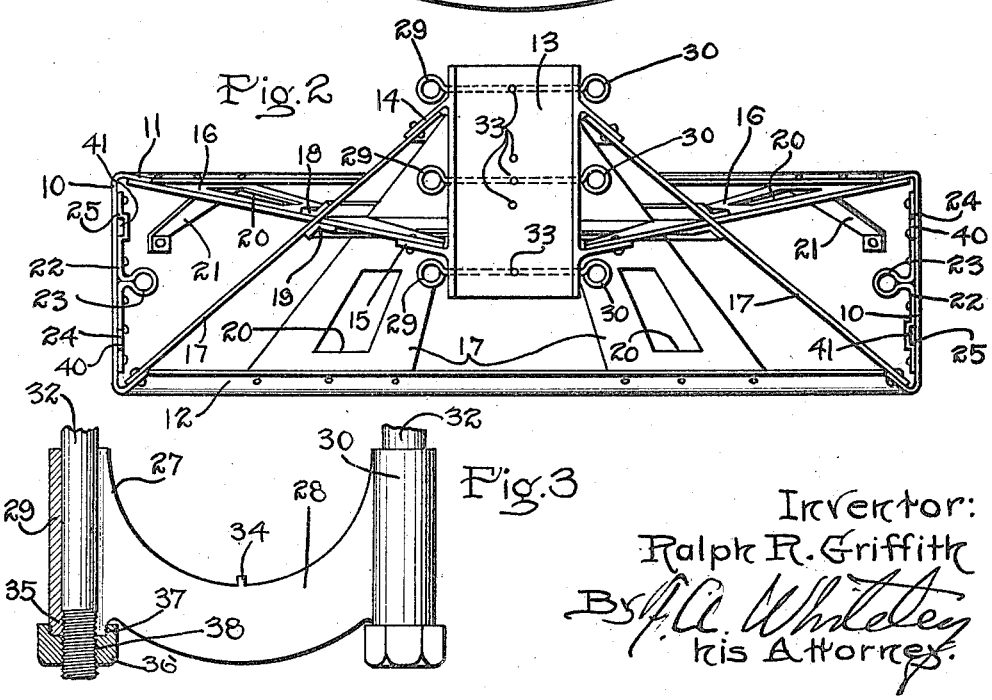
Fig. 2
Fig. 3
Inventor:
Ralph R. Griffith
By his Attorney

UNITED STATES PATENT OFFICE.

RALPH R. GRIFFITH, OF MINNEAPOLIS, MINNESOTA.

SPLIT PULLEY.

1,268,242.   Specification of Letters Patent.   Patented June 4, 1918.

Application filed December 22, 1916.   Serial No. 138,326.

*To all whom it may concern:*

Be it known that I, RALPH R. GRIFFITH, a citizen of the United States, residing at Minneapolis, in the county of Hennepin and State of Minnesota, have invented certain new and useful Improvements in Split Pulleys, of which the following is a specification.

My invention relates to pulleys and has for an object to provide a split pulley formed entirely of sheet metal of very rigid construction. A specific object is to provide a number of flat sheet metal arms which cross each other between the hub and rim and are riveted to slanting flanges thereon and which are securely held together at their points of intersection by a pair of annular angle members welded thereto. A still further object is to provide a number of detachable clamp members adapted to be positioned about the hub to securely clamp the pulley upon the shaft.

The full objects and advantages of my invention will appear in connection with the detailed description thereof and are particularly pointed out in the claims.

In the drawings, illustrating the application of my invention in one form,—

Figure 1 is a front elevational view of my invention. Fig. 2 is a plan view of one of the pulley sections showing the construction of the same. Fig. 3 is an elevational view of one of the clamp members detached drawn to a larger scale with some parts drawn in section.

The pulley is formed of two halves identical in construction. Each half comprises a rim section 10 which is formed by rolling in the usual manner, said rim being constructed semi-cylindrical with inturned flanges 11 and 12. A hub section 13, also semicylindrical has welded to it a pair of flanges 14 and 15 which are positioned remotely from the ends thereof. The hub and rim are firmly secured together by a web member constructed as follows. A number of segmental strips of sheet metal 16 and 17 are alternately secured to the rim and hub flanges of the pulley sections in crossed relation, strips 16 being secured to flanges 11 and 15 of the rim and hub respectively, and strips 17 being secured to flanges 12 and 14. These flanges are formed conical and of such angularity as to permit the strips or arms 16 and 17 to be attached to them, preferably by riveting, without bending, which greatly simplifies the construction and also makes the wheel more rigid. At the points of intersection of the crossed arms, the same are rigidly secured together by a pair of arcuate angular members 18 and 19 which may be either welded to said spokes or riveted thereto. The spokes or arms are hence deprived of relative longitudinal motion, which greatly stiffens the wheel.

In the drawings the hub has been shown as offset from the rim. This effect is produced by lengthening one set of strips, which in this case are the strips 17, and by providing the flanges 11, 12, 14 and 15 of a corresponding angularity. Such a pulley is of especial value where it becomes necessary to have the rim overhang a bearing or when it is desirable to attach a clutch mechanism within the pulley.

When a relatively wide rim is employed I brace the same as follows. In the larger end of each of the strips 16 and 17 is made a U-shaped cut 20 forming an ear 21, which ear is bent inwardly and riveted to the rim 10 of the pulley. Due to the fact that the strips or spokes are constructed with radial sides, there is an excess of material at the rim portion thereof so that the removal of a part of the material thereof does not appreciably reduce the strength of the pulley.

In securing the two halves of the pulley together I employ a number of detachable clamp members at the hub, one of which is shown in detail in Fig. 3, and I further employ a pair of fixed members for the rim. The latter device is best shown in Fig. 2 and consists of a strip of metal 22 looped at 23 to fit about a bolt and formed with wing portions 24 and 25 which are securely riveted to the rim proper near the ends of the same. The wing portion 24 is formed with an outwardly-projecting lug 40 and wing 25 with a socket 41 which serve to guide the rim sections in place when the same are assembled. All extremities of the rims are provided with these members, which have the openings therein registering so that bolts 26 may be passed through the same to draw up the rim sections to form a rigid and continuous rim. Although only one bolt has been shown at each joint of the rim, it becomes evident that the member 22 could be formed with two or more loops and a corresponding number of bolts employed, or that two or more independent members might be used when the width of the rim would warrant it.

The device employed at the hub is also constructed of sheet metal. A strip 27 is formed with a central arcuate portion 28 adapted to fit snugly over the hub of the pulley and with portions 29 and 30 which are bent around to form longitudinal holes through which bolts 32 may be inserted. It will be noted that with this construction the bolts are brought up extremely close to the hub or to the shaft to which the pulley is to be attached.

The central element of each hub section is punched with a number of holes 33 in which may be inserted a small lug 34 formed on the inner edge of the arcuate portion 28 of clamp member 27. This device serves to guide the clamp member in place upon the hub and also serves to retain the same in proper position after the pulley sections are mounted on the shaft. With the number of holes shown two, three or four hub clamps may be employed as desired.

The clamp members are placed together upon the hub in pairs with the holes registering and bolts 32 passed through the same. When the bolts are tightened the hub sections are tightly clamped upon the shaft or upon wood bushings which may be employed between the hub and shaft to securely hold the pulley in place thereon. When a hub of any length is employed any number of clamp units desired may be used. In the pulley illustrated three are used, one in the center and one on each end.

To facilitate assembling the pulley sections the device shown in Fig. 3 may be employed. Member 29 at its extreme end is threaded for a short distance at 35 and a special nut 36 used in conjunction with bolt 32 which is threaded at 37 to screw upon the portion 35 of member 29 and which is threaded at 38 to receive the bolt proper. In assembling, the nut 36 is first screwed upon member 29 and the parts brought in place, after which the bolt can easily be screwed into the nut. By inverting one of the bolts, as clearly shown in Fig. 1, each of the members 27 can be made identical in construction and the pulley can be assembled with greater ease. If desired the threads at 35 and 37 may be made left-handed to prevent the nut from unscrewing when the bolt is applied thereto.

The advantages of my invention are manifest. The pulley can be constructed at a very small cost. Inasmuch as only steel is used the pulley is very rigid and durable. Any number of clamp elements may be placed upon the hub up to the maximum number to give the pulley the required friction grip upon the shaft to transmit the torque necessary for the desired power purposes.

I claim:

1. A pulley comprising a rim of sheet metal having its edges turned inwardly to form inclined flanges, a hub provided with a pair of inwardly-inclined flanges, and a central web member having arms inclined to correspond to the inclination of said rim and hub flanges and secured thereto.

2. A pulley comprising a rim of sheet metal having its edges turned inwardly to form inclined flanges, a hub provided with a pair of inwardly-inclined flanges, and a central web member having arms alternately secured to the flanges at opposite sides of said rim and hub in crossed relation to each other, said arms having an inclination corresponding to the inclination of said rim and hub flanges.

3. A pulley comprising a rim of sheet metal having its edges turned inwardly to form inclined flanges, a hub provided with a pair of inwardly-inclined flanges, and a central web member having arms alternately secured to the flanges at opposite sides of said rim and hub in crossed relation to each other, each of said arms having a bracing member extending inwardly therefrom and secured to said rim.

4. A pulley comprising a rim of sheet metal having its edges turned inwardly to form inclined flanges, a hub provided with a pair of inwardly-inclined flanges, a central web member having arms alternately secured to the flanges at opposite sides of said rim and hub in crossed relation to each other, and means for rigidly securing said arms together where they cross each other.

5. A split pulley having a split hub, a detachable clamp mounted upon the hub for clamping the pulley sections upon the shaft, said clamp including a bolt-receiving boss externally threaded at one end thereof, a nut having a threaded bore of two diameters adapted to screw upon said threaded boss at one of said diameters, and a bolt adapted to pass through said boss and screw into said nut at the other diameter thereof.

6. A pulley having a rim and a hub, a plurality of arms alternately secured to opposite sides of said rim and hub in crossed relation to each other, and a member rigidly securing all of said arms together at the points of crossing thereof.

7. A pulley having a rim and a hub, a plurality of arms alternately secured to opposite sides of said rim and hub in crossed relation to each other, and a circular member rigidly securing all of said arms together at points of crossing thereof.

8. A pulley having a rim and a hub, a plurality of arms formed of sheet metal alternately secured to opposite sides of said rim and hub in crossed relation to each other, and a pair of circular members welded to said arms at the points of crossing thereof to securely hold the arms together, said members being positioned one on each side of the arms.

9. A pulley having a rim, a hub and a central web member formed of sheet metal and secured to said rim and hub, said web member having a number of ears formed from the body thereof and bent inwardly and secured to the rim of the wheel for bracing the same.

10. A pulley having a rim, a hub and a plurality of arms formed of sheet metal and secured to said rim and hub in crossed relation to one another, said arms having ears formed from the body of the metal of each of said arms and bent inwardly and secured to the rim of the wheel for bracing the same.

In testimony whereof I affix my signature.

RALPH R. GRIFFITH.

Copies of this patent may be obtained for five cents each, by addressing the "Commissioner of Patents, Washington, D. C."